(12) United States Patent
Reynoso (10) Patent No.: US 11,125,352 B1
(45) Date of Patent: Sep. 21, 2021

(54) MAGNETICALLY ACTUATED FLUID CONTROL VALVE

(71) Applicant: United States of America as represented by the Secretary of the Navy, Arlington, VA (US)

(72) Inventor: Bryan Reynoso, Ponte Vedra Beach, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/778,571

(22) Filed: Jan. 31, 2020

(51) Int. Cl.
*F16K 31/08* (2006.01)

(52) U.S. Cl.
CPC .................................. *F16K 31/082* (2013.01)

(58) Field of Classification Search
CPC .................................................. F16K 31/085
See application file for complete search history.

(56) References Cited

U.S. PATENT DOCUMENTS

| | | | | |
|---|---|---|---|---|
| 3,606,241 A | * | 9/1971 | Bornholdt | H01F 7/088 251/52 |
| 3,949,964 A | * | 4/1976 | Freeman | F16K 31/0655 251/76 |
| 4,976,854 A | * | 12/1990 | Yano | B01D 19/0057 184/6.24 |
| 5,267,721 A | * | 12/1993 | Stroh | F16K 31/06 251/121 |
| 6,082,705 A | * | 7/2000 | Arvidsson | A61M 16/204 251/129.07 |
| 6,517,045 B1 | * | 2/2003 | Northedge | F16K 31/082 251/65 |
| 8,678,033 B2 | * | 3/2014 | Bengea | F16K 31/0679 137/614.17 |
| 8,746,280 B2 | * | 6/2014 | Hoffmann | F16K 31/082 137/625.48 |
| 10,024,454 B2 | * | 7/2018 | Baxendell | A62C 3/07 |

* cited by examiner

*Primary Examiner* — Eric Keasel
(74) *Attorney, Agent, or Firm* — James T. Shepherd (57) ABSTRACT

A magnetically actuated fluid control valve has an internal flooding chamber, an internal piston chamber and a fluid inlet and outlet. The fluid inlet and outlet are in fluid communication with the flooding chamber. A piston is movable within the piston chamber and the flooding chamber. The piston is movable to a closed position wherein fluid cannot flow through the valve, and an open position wherein fluid can flow through the valve. The valve body and piston are fitted with electromechanical and permanent magnets, respectively. Selective electrical excitation of the electromechanical magnets on the valve body cause them to attract or repel the permanent magnets on the piston, causing the piston to move to either the open or closed position.

18 Claims, 6 Drawing Sheets

MAGNETICALLY ACTUATED FLUID CONTROL VALVE

STATEMENT OF GOVERNMENT INTEREST

The invention described herein may be manufactured and used by or for the Government of the United States of America for Governmental purposes without the payment of any royalties.

FIELD OF THE INVENTION

The present invention relates to a magnetically actuated fluid control valve.

BACKGROUND

Many conventional valves utilize electrically powered components that, when energized, open and close the valve. One conventional valve utilizing an electrically powered component to open and close the valve is a solenoid valve. The conventional solenoid valve has a valve body and utilizes a solenoid that drives a shaft into or away from the valve body. Conventional solenoid valves have either a normally closed state or a normally open state. In the normally closed state or normally open state, the solenoid does not require any electrical power. However, the solenoid requires constant electrical energization in order to configure the solenoid valve to an opposite state, e.g. closed state to open state or open state to closed state. Thus, a relatively high amount of electrical power is required to change the state of the solenoid valve. Flow properties, such as flow rate, are based on the sizes of the passageways located within the valve body. Large valve bodies require large solenoids and hence, even more electrical power. Furthermore, for rapid flooding purposes, a large valve inlet and large valve outlet are required for mass flow. However, conventional solenoid valves are limited to the routing that is internal to the valve body, thereby causing restricted flow. Another conventional valve utilizing electrical powered components is the motor-driven ball valve. The motor-driven ball valve requires a large electrical signal only to change valve position. For motor-driven valves having large-sized orifices and valves rated for higher pressure (e.g. deeper death), a larger and more capable motor is required, thereby requiring greater electrical power consumption and a larger footprint.

What is needed is a new valve that eliminates the problems and deficiencies of conventional solenoid-type valves and motor-driven valves.

SUMMARY OF THE INVENTION

In some embodiments, the present invention is directed to a magnetically actuated fluid control valve comprising a valve body having an external surface, an internal flooding chamber, a valve inlet in fluid communication with the flooding chamber, a valve outlet in fluid communication with the flooding chamber and an internal piston chamber. The piston is movably disposed within the piston chamber and the flooding chamber. The piston has a front portion and a rear portion. The piston is movable in a first direction to a closed position and in an opposite second direction to an open position. When the piston is in the closed position, the front portion of the piston plugs the valve inlet to prevent external fluid from flowing into the flooding chamber. When the piston is in the open position, the external fluid flows through the valve inlet and into the flooding chamber and out through the valve outlet. The valve body further comprises a backpressure fluid inlet in fluid communication with the piston chamber to allow external fluid to enter the piston chamber so as to produce fluid backpressure at the rear portion of the piston. The fluid control valve further comprises a piston actuation assembly for producing magnetic fields having particular magnetic polarities that magnetically dispose the piston in a selected one of the open position and the closed position.

Certain features and advantages of the present invention have been generally described in this summary section. However, additional features, advantages and embodiments are presented herein or will be apparent to one of ordinary skill in the art in view of the drawings, specification and claims hereof. Accordingly, it should be understood that the scope of the invention shall not be limited by the particular embodiments disclosed in this summary section.

DESCRIPTION OF EXEMPLARY EMBODIMENTS OF THE INVENTION

Figure 1:
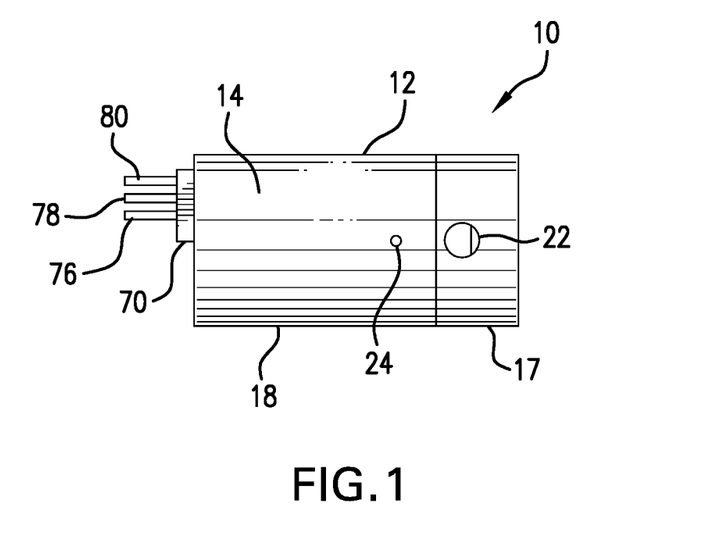
FIG. 1 is a side elevational view of a magnetically actuated fluid control valve in accordance with an exemplary embodiment of the present invention.
Figure 2:
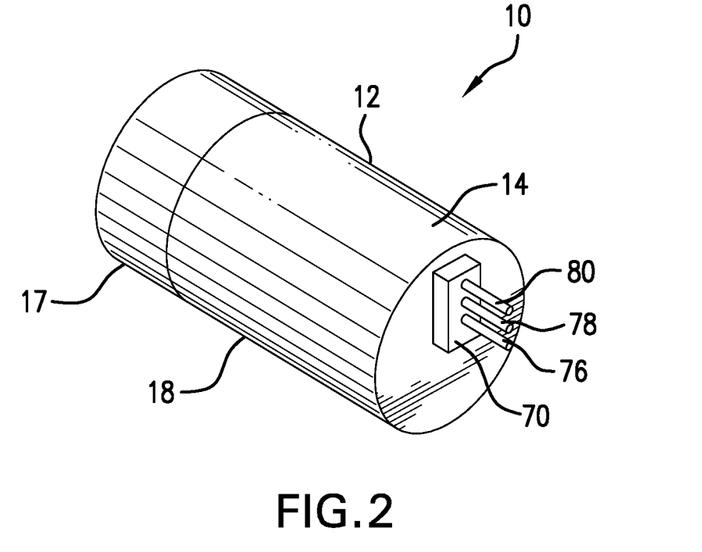
FIG. 2 is a rear perspective view of the magnetically actuated fluid control valve.
Figure 3:
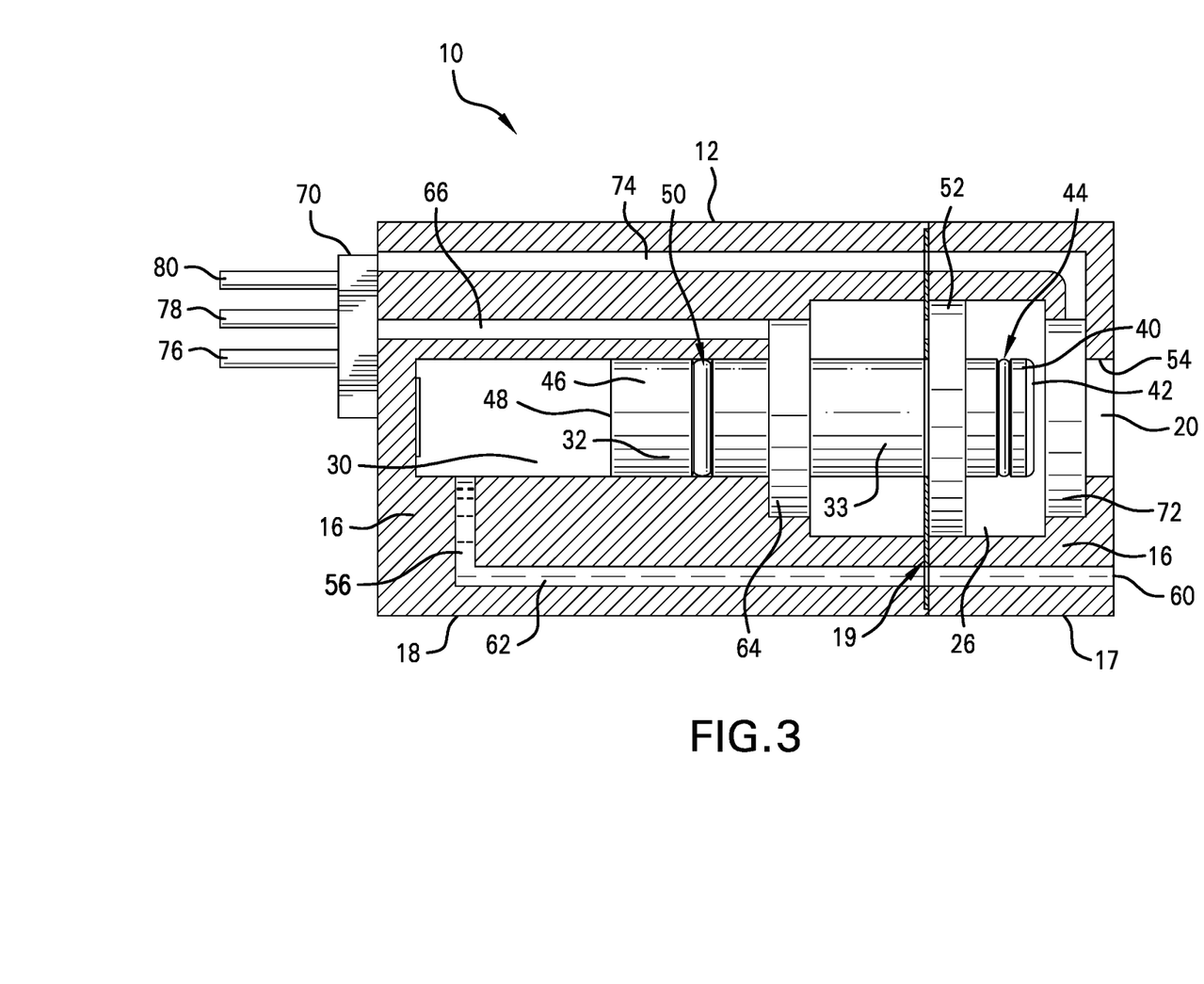
FIG. 3 is a cross-sectional view of the magnetically actuated fluid control valve.

Referring to FIGS. 1-3, there is shown magnetically actuated fluid control valve 10 in accordance with an exemplary embodiment of the present invention. Valve 10 comprises valve body 12 which has exterior surface 14. In an exemplary embodiment, valve body 12 has a substantially cylindrical shape. In an exemplary embodiment, valve body 12 is formed from a solid piece of material 16. Suitable materials include metals such as steel, stainless steel, copper, brass, Aluminum, Nickel and alloys comprising two or more of the aforementioned metals. Other suitable materials include plastic, resin, rubber, PVC (polyvinyl chloride), poly carbonate and composite materials. In an exemplary embodiment, valve body 12 comprises sections 17 and 18 that are joined or attached together by any suitable means or techniques. The techniques or means by which sections 17 and 18 are joined together depend upon the particular materials from which valve body 12 is fabricated. Seal 19 creates a watertight seal between sections 17 and 18. In an exemplary embodiment, seal 19 is configured as an "O" ring seal. Seal 19 is fabricated from any suitable material, e.g. rubber, Viton®, Silicone, Nitrile, Neoprene, Teflon® and EPDM (Ethylene Propylene Diene Monomer) rubber.

Referring to FIGS. 1, 3 and 5-8, valve body 12 further includes valve inlet 20, valve outlet 22 and vent hole or opening 24. Valve body 12 is formed with an internal flooding chamber 26. Valve inlet 20, valve outlet 22, and vent hole 24 are in fluid communication with flooding chamber 26. Valve outlet 22 and vent hole 24 are not shown in FIGS. 3 and 5-8 for clarity of illustration. Valve body 12 is also formed with an internal piston chamber 30. Flooding chamber 26 and piston chamber 30 are formed in material 16 via machining, drilling, cutting and/or any other suitable technique. Piston 32 moves within both piston chamber 30 and flooding chamber 26. Piston 32 is configured for linear, bi-directional movement in direction 34 and in opposite direction 36 (see FIGS. 6 and 8). Piston 32 includes exterior surface 33 and front portion 40. Front portion 40 is sized to fit within valve inlet 20. Front portion 40 includes front end surface 42. Piston 32 further includes circumferentially extending groove that is adjacent to front portion 40 and "O" ring seal 44 that is positioned in the circumferentially extending groove (see FIG. 3). Seal 44 is the front piston seal. Piston 32 further includes rear portion 46. Rear portion 46 includes rear end surface 48. Piston 32 further includes an additional circumferentially extending groove and "O" ring seal 50 that is positioned in the additional circumferentially extending groove. "O" ring seal 50 creates a seal between exterior surface 33 of piston 32 and the portion of material 16 that forms the piston chamber wall. Seal 50 is the rear piston seal. Seals 44 and 50 may be fabricated from any of the aforementioned materials described with respect to seal 19.

Figure 5:
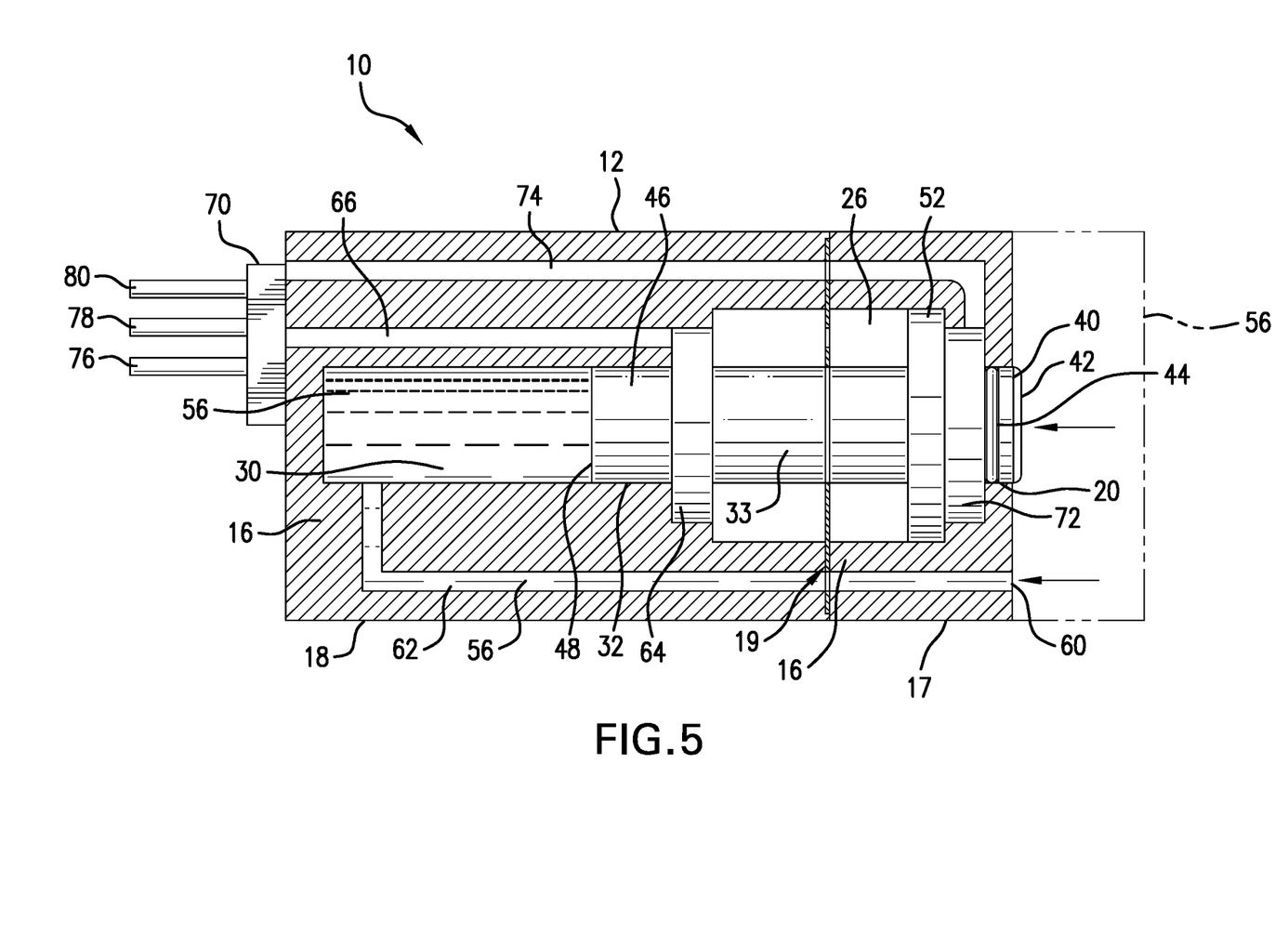
FIG. 5 is a cross-sectional view of the magnetically actuated fluid control valve wherein the piston is in a closed position.

Referring to FIG. 3, piston 32 includes permanent magnet 52 that is mounted, attached or joined to exterior surface 33 of piston 32. Permanent magnet 52 circumferentially extends about piston 32. In an exemplary embodiment, permanent magnet 52 is configured as a donut or ring permanent magnet. Permanent magnet 52 is positioned on the portion of piston 32 that is located within flooding chamber 26. Permanent magnet 52 is part of a piston actuation assembly which is described in detail in the ensuing description. Piston 32 is movable in first direction 34 (see FIG. 8) to a closed position wherein front portion 40 plugs valve inlet 20 and "O" ring seal 44 forms a seal between piston front portion 40 and interior surface 54 of valve inlet 20. When piston 32 is in the closed position, as shown in FIG. 5, external fluid 56 (e.g. water) cannot flow into valve 10 through valve inlet 20. Piston 32 is also movable in an opposite direction 36 (see FIG. 6) to an open position as shown in FIG. 7. When piston 32 is positioned in the open position, front portion 40 is withdrawn from valve inlet 20 and external fluid 56 flows through valve inlet 20 and into flooding chamber 26 and then out through valve outlet 22. Relief opening 24 allows ambient air or fluid to exit flooding chamber 26 as piston 32 moves away from valve inlet 20 in opposite second direction 36.

Referring to FIGS. 3 and 5-8, valve 10 includes backpressure fluid inlet 60 and fluid conduit 62. In an exemplary embodiment, fluid conduit 62 is formed by machining, drilling, cutting and/or any other suitable technique. Fluid conduit 62 is fluidly connected between backpressure fluid inlet 60 and piston chamber 30. External fluid 56 flows into backpressure fluid inlet 60 and flows through fluid conduit 62 and into piston chamber 30 thereby producing back pressure on piston 32. The purpose of this configuration is described in the ensuing description.

Figure 4:
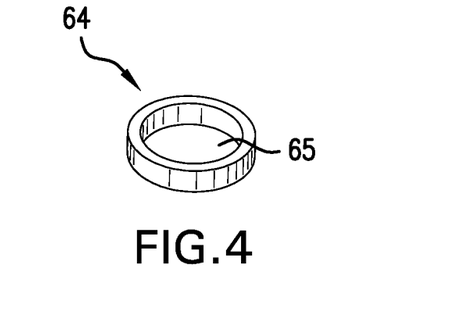
FIG. 4 is a perspective view of an electromagnet shown in FIG. 3.

Valve 10 includes a piston actuation assembly for producing magnetic fields having particular magnetic polarities that magnetically dispose piston 32 in a selected one of the open position and the closed position. The piston actuation assembly comprises internal electromagnet 64 that is seated or positioned within a circumferentially extending groove formed in material 16 of valve section 18. In an exemplary embodiment, this circumferentially extending groove is formed in material 16 by machining, drilling, cutting and/or any other suitable technique. In an exemplary embodiment, electrically insulative potting material (not shown) is disposed within the circumferentially extending groove and electromagnet 64 is joined to or pressed into the electrically insulative potting material. The electrically insulative potting electrically insulates electromagnet 64 from valve body 12. In an exemplary embodiment, shown in FIG. 4, electromagnet 64 is configured as an annular donut or ring electromagnet and has central opening 65 through which piston 32 moves. Valve 10 includes channel 66 that contains electrical wires (not shown) that are connected to electromagnet 64. The ends of the aforesaid electrical wires are embedded in the electrical insulative potting so as not to contact valve body 12 or any fluid. The electrical wires in channel 66 are also electrically connected to electrical connector 70 that is attached to exterior surface 14 of valve body 12. Channel 66 is water-tight and protects the wires therein from any fluid or moisture. Channel 66 is formed in material 16 via machining, drilling, cutting and/or any other suitable technique.

The piston actuation assembly further comprises internal electromagnet 72 that is adjacent to valve inlet 20. Electromagnet 72 has the same shape and structure as electromagnet 64 described in the foregoing description and shown in FIG. 4. Thus, electromagnet 72 has a central opening through which front portion 40 of piston 32 passes. The central opening of electromagnet 72 is coaxially aligned with valve inlet 20. Electromagnet 72 is seated or positioned in a corresponding circumferentially extending groove formed in material 16 of valve section 17. In an exemplary embodiment, electrically insulative potting material (not shown) is disposed within the circumferentially extending groove and electromagnet 72 is joined to or pressed into the electrically insulative potting material. The electrically insulative potting electrically insulates electromagnet 72 from valve body 12. When piston 32 moves in direction 34 to the closed position, piston 32 moves through the central opening of electromagnet 72 and into valve inlet 20. Valve body 12 includes channel 74 that contains electrical wires (not shown) that are connected to electromagnet 72 and electrical connector 70. The ends of the aforesaid electrical wires are embedded in the electrical insulative potting so as not to contact valve body 12 or any fluid. Conduit 74 is watertight and protects the electrical wires therein from any fluid or moisture. Channel 74 may be formed in material 16 via machining, drilling, cutting and/or any other suitable technique.

Seal 19 includes a central opening (not shown) that is sized for the passage therethrough of piston 32. Seal 19 further includes openings (not shown) that are aligned with fluid conduit 62 and channel 74.

In an exemplary embodiment, electrical connector 70 includes connector pins 76, 78 and 80. Pin 76 is an electrical ground pin. Pin 78 is electrically connected to the electrical wires in channel 66 and pin 80 is electrically connected to the electrical wires in channel 74. Electrical connector 70 is electrically connected to an external power source (not shown) that is controlled by an external or on-board computer, microprocessor or other microcontroller (not shown). The external power source provides electrical current that selectively excites or energizes each electromagnet 64 and electromagnet 72. Each electromagnet 64 and 72 produces a magnetic field when the electromagnet is excited or energized. Each magnetic field has a particular magnetic polarity depending upon the direction of the electrical current that is used to excite the electromagnet. The purpose of electromagnets 64 and 72 is described in detail in the ensuing description.

Figure 6:
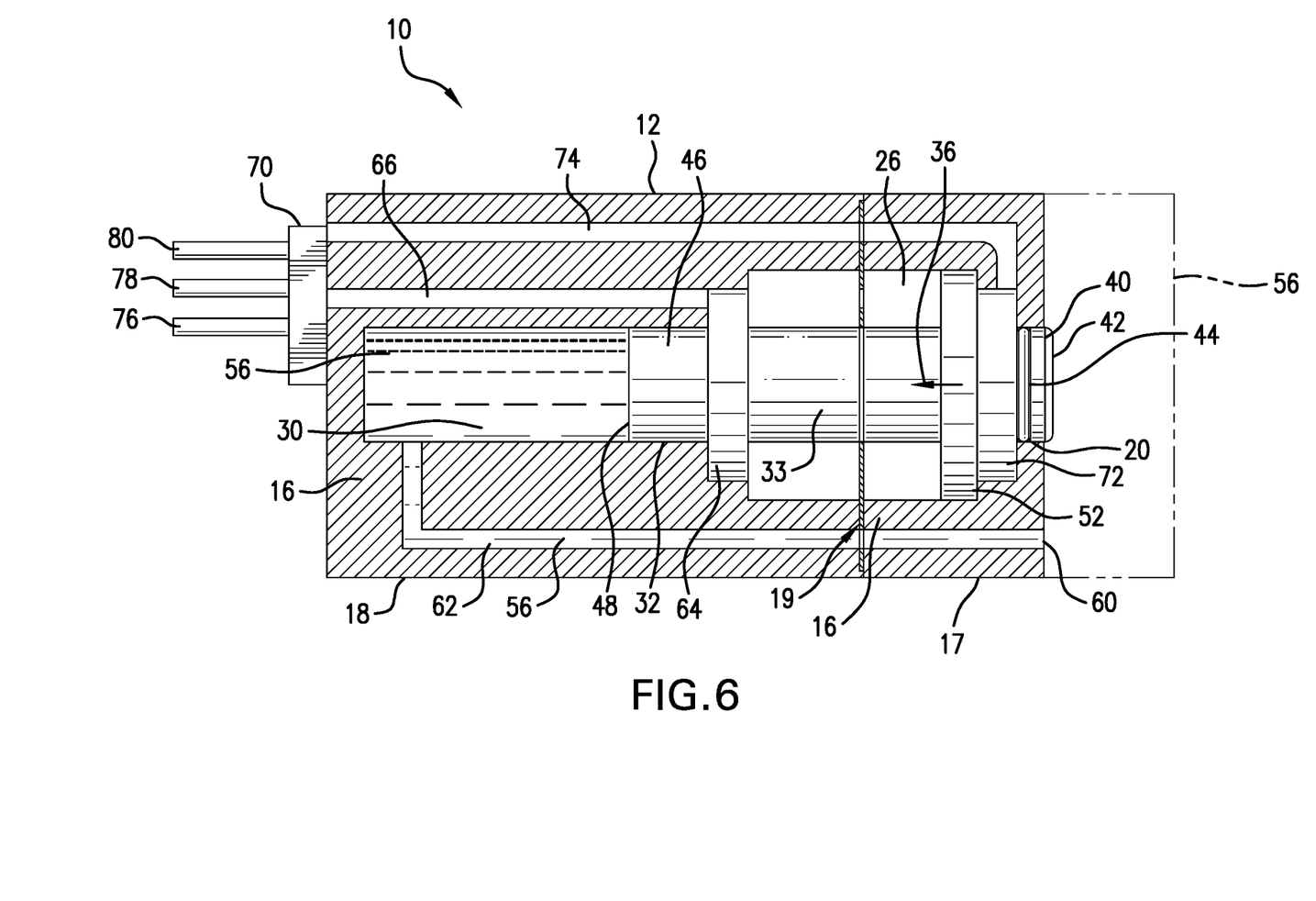
FIG. 6 is a cross-sectional view of the magnetically actuated fluid control valve, the view illustrating a direction in which the piston is induced to move by a magnetic field produced by a first electromagnet adjacent to the valve inlet.
Figure 7:
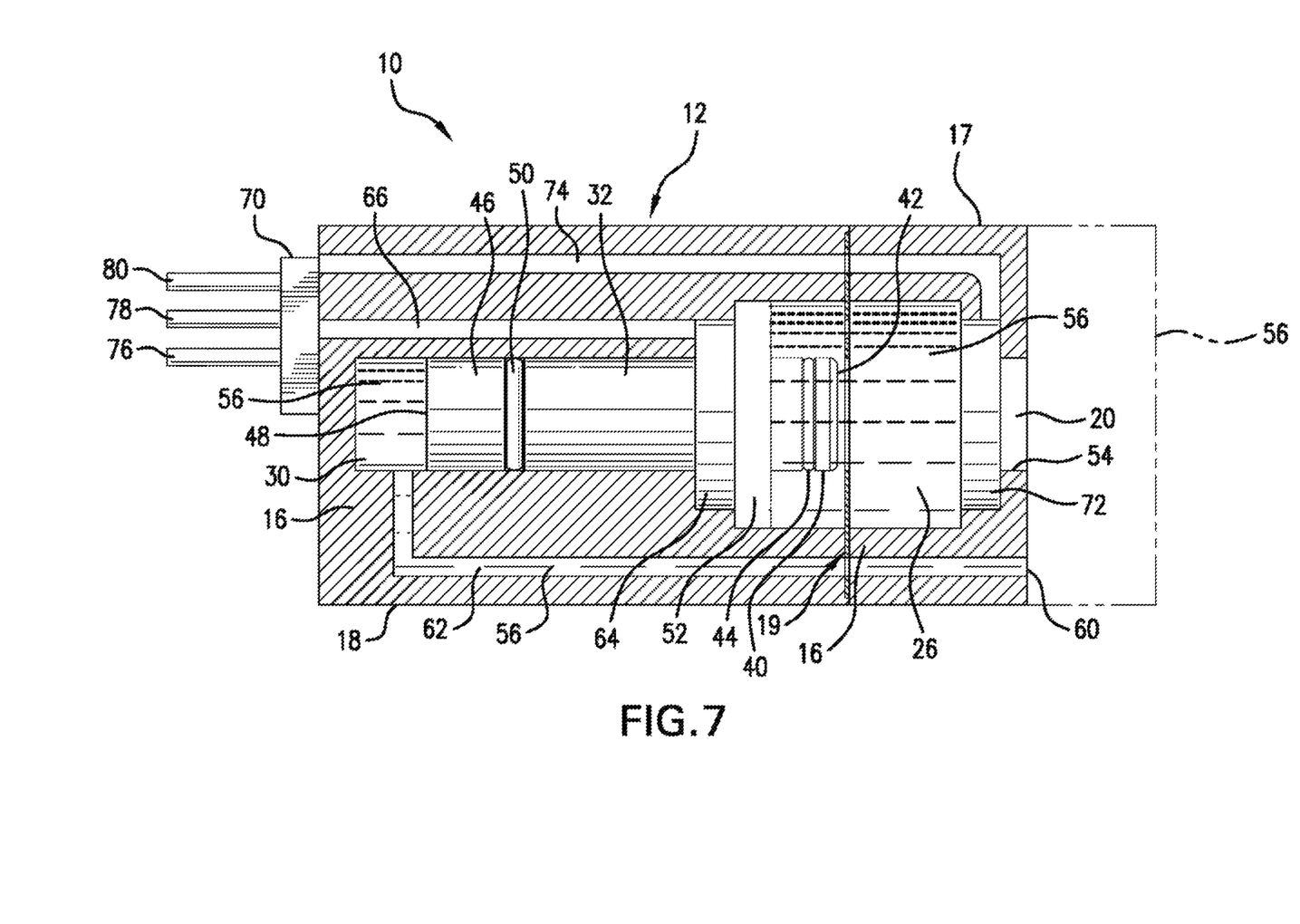
FIG. 7 is a cross-sectional view of the magnetically actuated fluid control valve wherein the piston is in an open position.

Referring to FIGS. 3, 5 and 6, valve 10 utilizes back pressure on piston 32 to zero out ambient forces acting on piston 32. The back pressure is provided by external fluid 56 that enters backpressure fluid inlet 60 and flows into piston chamber 30. Front portion 40 of piston 32 has front end surface 42. Rear portion 46 of piston 32 has rear end surface 48. Piston 32 is configured so that the surface area of front end surface 42 is equal to or substantially the same as the surface area of rear end surface 48. As a result of the equal surface areas, the water pressure on front end surface 42 is equal to the water pressure on rear end surface 48 when piston 32 is in the closed position (see FIGS. 5 and 6) or in the open position (see FIGS. 7 and 8). Thus, the fluid forces on front end surface 42 and rear end surface 48 are at equilibrium when piston 32 is in the closed position and the open position.

Referring to FIG. 5, when piston 32 is in the closed position, front portion 40 of piston 32 is positioned within valve inlet 20 to close valve 10 and electromagnets 64 and 72 are not excited or energized. In such a scenario, the metal of permanent magnet 52 is attracted to electromagnet 72. "O" ring seal 44 frictionally contacts interior surface 54 of valve inlet 20. As a result of the attraction of the metal of electromagnet 72 to permanent magnet 52 and the frictional contact between "O" ring seal 44 and interior surface 54 of valve inlet 20, piston 32 is maintained in the closed position. The fluid force or pressure on piston 32 is at equilibrium because the fluid pressure on front end surface 42 is equal to the fluid pressure on rear end surface 48 as described in the foregoing description. When it is desired to position piston 32 in the open position in order to open valve 10, an electrical current having a first direction is provided to electromagnet 72 for a predetermined amount of time in order to excite or energize electromagnet 72. In response, electromagnet 72 generates a magnetic field having a magnetic polarity that is the same as the magnetic polarity of permanent magnet 52. As a result, the magnetic field generated by electromagnet 72 repels the magnetic field of permanent magnet 52 thereby inducing movement of piston 32 in direction 36 (see FIG. 6). As piston 32 moves in direction 36, front portion 40 is withdrawn from valve inlet 20 thereby allowing external fluid 56 to flow through valve inlet 20 and into flooding chamber 26. The force of external fluid 56 flowing into flooding chamber 26 also facilitates movement of piston 32 in direction 36. In order to further facilitate movement of piston 32 in direction 36, an electrical current may also be applied to electromagnet 64 to excite or energize electromagnet 64 so as to produce a magnetic field having a magnetic polarity that attracts permanent magnet 52. This magnetic attraction further induces movement of piston 32 in direction 36. As piston 32 moves in direction 36, ambient air or fluid in flooding chamber 26 is vented through relief opening 24. Once piston 32 arrives at the open position, shown in FIG. 7, permanent magnet 52 physically contacts electromagnet 64. Electromagnets 64 and 72 are then de-energized. However, the metal of permanent magnet 52 is attracted electromagnet 64 to thereby maintain piston 32 in the open position. External fluid 56 continues to flow through valve inlet 20 and into flooding chamber 26 and then out through valve outlet 22. Once forward chamber 26 is completely flooded, pressure equilibrium is once again attained wherein the fluid pressure at front end surface 42 of piston 32 is equal to the fluid pressure at rear end surface 48 of piston 32.

Figure 8:
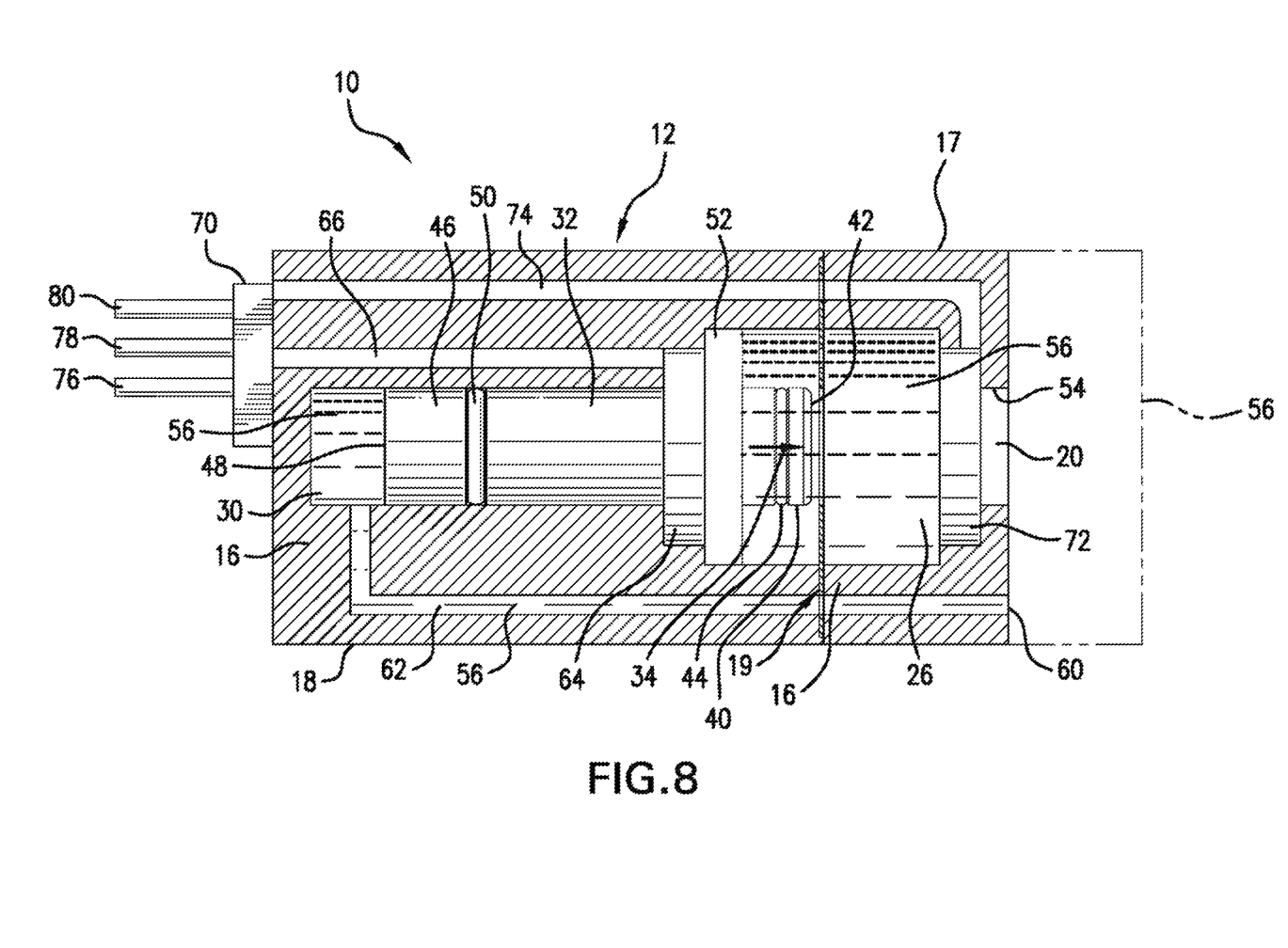
FIG. 8 is a cross-sectional view of the magnetically actuated fluid control valve, the view illustrating an opposite direction in which the piston is induced to move by a magnetic field produced by a second electromagnet that is positioned at a predetermined distance from the first electromagnet.

If it is desired to close valve 10, then electromagnet 64 is excited or energized with an electrical current that causes electromagnet 64 to generate a magnetic field having a magnetic polarity that opposes the magnetic polarity of permanent magnet 52. The opposing magnetic polarity of electromagnet 64 repels permanent magnet 52 in direction 34 as shown in FIG. 8. An electrical current may also be applied to electromagnet 72 to configure electromagnet 72 to generate a magnetic field having a magnetic polarity that attracts permanent magnet 52. As a result, piston 32 continues to move in direction 34 until it becomes positioned again in the closed position shown in FIG. 5. When piston 32 is in the closed position, permanent magnet 52 physically contacts electromagnet 72. All electrical current delivered to the electromagnets is ceased and the electromagnets 64 and 72 are de-energized. However, the metal of electromagnet 72 is attracted to permanent magnet 52 thereby maintaining piston 32 in the closed position. Valve inlet 20 is totally plugged and external fluid 56 ceases flowing into flooding chamber 26. The opposing fluid pressures on front end surface 42 of piston 32 and rear end surface 48 of piston 32 are now at equilibrium and piston 32 is held in the closed position by the attraction of permanent magnet 52 to the metal of electromagnet 72 and the frictional contact between "O" ring seal 44 and interior surface 54 of valve inlet 20.

Valve 10 can be used with a variety of fluids, e.g. fresh water, salt water or mixtures thereof, coolant, fluids containing chemicals, hydraulic fluid, etc. The size, length and geometry of valve 10 may be varied based on available space and function requirements. Permanent magnet 52 and electromagnets 64 and 72 may be chosen for a particular magnetic strength. Such magnetic strength may be varied and depends upon the size and configuration of valve 10, piston 32, the quantity and size of the "O" ring seals 44 and 50 and the pressure seen at the interface of piston 32 and interior surface 54 of valve inlet 20. The magnetic polarity of permanent magnet 52 and electromagnets 64 and 72 (i.e. north and south) may be switched or rearranged in a variety of combinations. In some embodiments, more than one "O" ring seal or gasket is used at the interface between piston 32 and interior surface 54 of valve inlet 20.

In some embodiments wherein the size of valve inlet 20 is very large, each electromagnet may be replaced by a plurality of electromagnets arranged radially about inlet 20. In some embodiments, permanent magnet 52 is replaced by an electromagnet that is attached or joined to piston 32. In such embodiments, electrical wiring is internal to piston 32 and is electrically connected to the electromagnet and electrical connector 70.

Valve 10 may be installed into a system in a variety of ways. For example, system piping can be directly connected to valve inlet 20. In one embodiment, valve body 12 is configured with circumferentially extending threads that can be threadably engaged with system piping. In another embodiment, valve body 12 comprises the aforementioned cylindrically extending threads plus an external "O" ring or gasket circumferentially extending about the cylindrical shaped valve body 12. In such an embodiment, a system pipe or fluid conduit is threadably engaged to the circumferentially extending threads and sealed to the valve body 12 by the "O" ring or gasket.

Valve 10 consumes significantly less electrical power than prior art valves that utilize solenoids. Electrical current is applied to electromagnets 64 and 72 only for a relatively short amount of time. As a result of the use of piston 32 to open and close valve 10, valve inlet 20 may have a relatively large size without significantly changing the geometry of valve 10. Since valve 10 uses internal electronics, valve 10 has a sleek body profile. On the other hand, conventional solenoid or motor actuated valves use some type of electrical device or component that is attached to some point on the valve body. Thus, valve 10 has an overall size envelope that is relatively smaller than the overall size envelopes of such conventional solenoid or motor actuated valves.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A magnetically actuated fluid control valve, comprising:
    a valve body having an external surface, an internal flooding chamber, said valve bogy having a valve inlet in fluid communication with said flooding chamber, a valve outlet in fluid communication with said flooding chamber, and a piston chamber;
    a piston movably disposed within said piston chamber and said flooding chamber, said piston having a front portion and a rear portion, said piston being movable in a first direction to a closed position and in an opposite second direction to an open position, wherein said front portion plugs said valve inlet to prevent external fluid from flowing into said flooding chamber when said piston is in said closed position and wherein external fluid flows through said valve inlet and into said flooding chamber and out through said valve outlet when said piston is in said open position;
    said valve body further comprising a backpressure fluid inlet in fluid communication with said piston chamber to allow fluid to enter said piston chamber so as to produce fluid backpressure at said rear portion of said piston; and
    a piston actuation assembly for producing magnetic fields having selectable magnetic polarities that magnetically move and hold said piston in a selected one of said open position and said closed position, said piston actuation assembly comprising
        a permanent magnet attached to said piston;
        a first electromagnet adjacent to said valve inlet, said first electromagnet having a central that is aligned with said valve inlet and sized to allow passage therethrough of said piston; and
        a second electromagnet located at a predetermined distance from said first electromagnet, said second electromagnet having a central opening for the passage there through of said piston;
        wherein each said electromagnet is configurable to have a magnetic field having a first magnetic polarity upon exciting said electromagnet with an electrical current having a first direction and a magnetic field laving an opposite second magnetic polarity upon exciting said electromagnet with an electrical current having an opposite second direction.

2. The magnetically actuated fluid control valve according to claim 1 wherein said valve body has a vent hole in communication with said flooding chamber to allow ambient air or fluid to exit said flooding chamber as said piston moves in said second direction to said open position.

3. The magnetically actuated fluid control valve according to claim 1 further comprising a circumferentially extending front seal on said front portion of said piston, wherein said front seal creates a seal at the interface of said front portion and said valve inlet when said piston is in said closed position.

4. The magnetically actuated fluid control valve according to claim 3 wherein said front portion of said piston has a groove formed therein and wherein said front seal comprises an "O" ring positioned within said groove.

5. The magnetically actuated fluid control valve according to claim 4 wherein said piston chamber has a piston chamber wall, and wherein the magnetically actuated fluid control valve further comprises a circumferentially extending rear seal on said piston to create a seal at the interface of said piston and said piston chamber wall.

6. The magnetically actuated fluid control valve according to claim 5 wherein said rear portion of said piston has an additional circumferentially extending groove formed therein and wherein said rear seal comprises an "O" ring seal positioned within said additional groove.

7. The magnetically actuated fluid control valve according to claim 1 wherein said permanent magnet circumferentially extends about said piston.

8. The magnetically actuated fluid control valve according to claim 1 wherein said piston actuation assembly further comprises:
    an electrical wiring circuit electrically coupled to said first electromagnet and said second electromagnet for distributing separate electrical currents to said first electromagnet and said second electromagnet;
    wherein, said electrical wiring circuit is configured to excite said first electromagnet with an electrical current that causes said first electromagnet to generate a first magnetic field having said first magnetic polarity that attracts said permanent magnet thereby inducing said piston to move in said first direction to said closed position; and
    wherein, said electrical wiring circuit is configured to excite said first electromagnet with another electrical current that causes said first electromagnet to generate a second magnetic field having said second opposite magnetic polarity that repels said permanent magnet thereby inducing said piston to move in said opposite second direction to said open position.

9. Them magnetically actuated fluid control valve according to claim 8 wherein said electrical wiring circuit further comprises an electrical signal connector attached to said exterior surface of said valve body and adapted to be connected to an electrical power source that generates said separate electrical currents.

10. The magnetically actuated fluid control valve according to claim 1 wherein said first electromagnet and said second electromagnet are electrically insulated from said valve body.

11. The magnetically actuated fluid control valve according to claim 1 wherein said valve body has a generally cylindrical shape.

12. The magnetically actuated fluid control valve according to claim 1 wherein said valve body comprises a pair of valve body sections that are joined together.

13. The magnetically actuated fluid control valve according to claim 12 further comprising a seal interposed between said pair of valve body sections.

14. A magnetically actuated fluid control valve, comprising:
- a valve body having an external surface, an internal flooding chamber, a valve inlet in fluid communication with said flooding chamber, a valve outlet in fluid communication with said flooding chamber, a piston chamber disposed adjacent to said flooding chamber and having a centerline aligned with the center of said valve inlet, a backpressure fluid inlet passing through said external surface and being in fluid communication with said piston chamber, and a vent hole passing through said external surface and being in communication with said flooding chamber, said piston chamber having a piston chamber wall;
- a piston movably disposed within said piston chamber and said flooding chamber, said piston having a front portion and a rear portion, said piston being positioned coaxially with said piston chamber and said valve inlet and being movable in a first direction to a closed position and in an opposite second direction to an open position, wherein said front portion is configured to plug said valve inlet to prevent external fluid from flowing into said flooding chamber when said piston is in said closed position;
- a first electromagnet disposed adjacent to said valve inlet, said first electromagnet having a central opening that is positioned and sized to allow passage therethrough of said piston;
- a second electromagnet disposed at a distance from said first electromagnet and adjacent to said piston chamber, said second electromagnet having a central opening that is positioned and sized to allow passage therethrough of said piston; and
- a permanent magnet attached to said piston and disposed between said first and second electromagnets;
- wherein each said electromagnet is configurable to have a magnetic field having a first magnetic polarity upon exciting said electromagnet with an electrical current having a first direction and a magnetic field having an opposite second magnetic polarity upon exciting said electromagnet with an electrical current having an opposite second direction.

15. The magnetically actuated fluid control valve according to claim 14, further comprising:
- an electrical wiring circuit electrically coupled to said first electromagnet and said second electromagnet, said electrical wiring circuit configured to distribute separate electrical currents to said first electromagnet and said second electromagnet; and
- an electrical signal connector coupled to said electrical ng circuit and adapted to be connected to an electrical power source that generates said separate electrical currents;
- wherein, said electrical wiring circuit is configured to excite said first electromagnet with a first electrical current that causes said first electromagnet to generate a first magnetic field having said first magnetic polarity that attracts said permanent magnet, and to excite said second electromagnet with a second electrical current that causes said second electromagnet to generate a second magnetic field having said second magnetic polarity that repels said permanent magnet, thereby inducing said piston to move in said first direction to said closed position; and
- wherein, said electrical wiring circuit is configured to excite said first electromagnet with a third electrical current that causes said first electromagnet to generate said second magnetic field having said second magnetic polarity that attracts said permanent magnet, and to excite said second electromagnet with a fourth electrical current that causes said second electromagnet to generate said first magnetic field having said first magnetic polarity that repels said permanent magnet, thereby inducing said piston to move in said first direction to said closed position.

16. The magnetically actuated fluid control valve according to claim 15, further comprising a circumferentially extending front seal on said front portion of said piston, wherein said front seal creates a seal at the interface of said front portion and said valve inlet when said piston is in said closed position.

17. The magnetically actuated fluid control valve according to claim 16 wherein said piston chamber has a piston chamber wall, and wherein the magnetically actuated fluid control valve further comprises a circumferentially extending rear seal on said piston to create a seal at the interface of said piston and said piston chamber wall.

18. The magnetically actuated fluid control valve according to claim 14 wherein said first electromagnet and said second electromagnet are electrically insulated from said valve body.

* * * * *